(12) United States Patent
Fujikawa et al.

(10) Patent No.: US 8,958,453 B2
(45) Date of Patent: Feb. 17, 2015

(54) GAS DISCHARGE LASER OSCILLATOR AND GAS DISCHARGE LASER AMPLIFIER PROVIDING LINEARLY POLARIZED LIGHT

(75) Inventors: Shuichi Fujikawa, Tokyo (JP); Junichi Nishimae, Tokyo (JP); Tatsuya Yamamoto, Tokyo (JP); Yoichi Tanino, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 212 days.

(21) Appl. No.: 13/496,892

(22) PCT Filed: Sep. 17, 2010

(86) PCT No.: PCT/JP2010/066153
§ 371 (c)(1),
(2), (4) Date: Mar. 19, 2012

(87) PCT Pub. No.: WO2011/040264
PCT Pub. Date: Apr. 7, 2011

(65) Prior Publication Data
US 2012/0182604 A1 Jul. 19, 2012

(30) Foreign Application Priority Data
Sep. 30, 2009 (JP) .................................. 2009-227375

(51) Int. Cl.
*H01S 3/22* (2006.01)
*H01S 3/08* (2006.01)
(Continued)

(52) U.S. Cl.
CPC ........... *H01S 3/0385* (2013.01); *H01S 3/08036* (2013.01); *H01S 3/08054* (2013.01); *H01S 3/081* (2013.01)
USPC ................................. 372/99; 372/58; 372/106

(58) Field of Classification Search
CPC ... H01S 3/081; H01S 3/0385; H01S 3/08036; H01S 3/08054

USPC ....................................... 372/58, 99, 100, 106
See application file for complete search history.

(56) References Cited

U.S. PATENT DOCUMENTS

| 3,919,665 | A | 11/1975 | Schmidt |
| 4,203,077 | A * | 5/1980 | Andringa et al. ............... 372/94 |
| 6,317,450 | B1 | 11/2001 | Reeder |

FOREIGN PATENT DOCUMENTS

| JP | 3 66185 | 3/1991 |
| JP | 4 44373 | 2/1992 |

(Continued)

OTHER PUBLICATIONS

International Preliminary Report on Patentability Issued May 8, 2012 in PCT/JP10/66153 Filed Sep. 17, 2010.

(Continued)

*Primary Examiner* — Eric Bolda
(74) *Attorney, Agent, or Firm* — Oblon, Spivak, McClelland, Maier & Neustadt, L.L.P.

(57) ABSTRACT

A laser oscillator includes: a optical resonator having an orthogonal mirror and a partial reflection mirror; a laser gas acting as a laser medium; and a 90-degree folding mirror acting as a polarization selecting element. The orthogonal mirror has two reflecting surfaces orthogonal to each other. The 90-degree folding mirror is arranged such that the polarization direction of the laser oscillated light is parallel to the reference axis set in a plane perpendicular to an optical axis of the optical resonator. The orthogonal mirror is arranged such that the polarization direction of the laser oscillated light is parallel to the valley line of the orthogonal mirror. This configuration can compensate anisotropy of optical characteristics in a laser medium, and stably generate linearly polarized laser light having excellent isotropy in a simple manner.

6 Claims, 10 Drawing Sheets

(51) Int. Cl.
*H01S 3/038* (2006.01)
*H01S 3/081* (2006.01)

(56) References Cited

FOREIGN PATENT DOCUMENTS

| JP | 5 175588 | 7/1993 |
|---|---|---|
| JP | 5 275778 | 10/1993 |
| JP | 7 226552 | 8/1995 |
| JP | 9-321367 | 12/1997 |
| JP | 2002 252398 | 9/2002 |
| JP | 2003 115627 | 4/2003 |
| TW | 430581 | 4/2001 |
| TW | 200737625 A | 10/2007 |
| TW | 200931745 A | 7/2009 |

OTHER PUBLICATIONS

Office Action issued Jun. 25, 2013 in Korean Patent Application No. 10-2012-7008104 (with Partial English translation).
International Search Report Issued Dec. 14, 2010 in PCT/JP10/66153 Filed Sep. 17, 2010.
Combined Chinese Office Action and Search Report issued Jun. 4, 2014 in Patent Application No. 201080043109.3 (with English language translation).
Combined Taiwanese Office Action and Search Report issued Feb. 25, 2014 in Patent Application No. 099131409 (with partial English language translation and English translation of categories of cited documents).
German Office Action issued Apr. 16, 2014, in German Patent Application No. 11 2010 003 879.1 (with English translation).

\* cited by examiner

GAS DISCHARGE LASER OSCILLATOR AND GAS DISCHARGE LASER AMPLIFIER PROVIDING LINEARLY POLARIZED LIGHT

TECHNICAL FIELD

The present invention relates to a laser oscillator to generate laser light. In addition, the present invention relates to a laser amplifier to amplify laser light.

BACKGROUND

In a conventional laser oscillator, in order to generate laser light having excellent isotropy from a laser medium having anisotropy or inhomogeneity in gain distribution, an image rotating optical system is constituted with a plurality of mirrors provided in a light path inside an optical resonator. The intensity distribution of the laser light is thereby rotated to a desired angle around an optical axis while the laser light passes through the laser medium. Consequently, the anisotropy of the gain distribution can be compensated to generate the laser light having excellent isotropy (See Patent Document 1).

In a conventional laser amplifier, an inversion optical system is constituted with orthogonal mirrors, and a light beam is spatially inverted, thereby reducing the effect of the asymmetry property of the laser medium (See Patent Document 2).

PRIOR ART DOCUMENT

Patent Document

[PATENT DOCUMENT 1] JP 5-275778 A
[PATENT DOCUMENT 2] JP 2003-115627 A
[PATENT DOCUMENT 3] JP 3-66185 A

DISCLOSURE OF THE INVENTION

Problem to be Solved by the Invention

In the conventional laser oscillator, since the image rotation optical system is constituted with many mirrors, the optical resonator has complicated configuration, and angular adjustment of the mirrors is considerably cumbersome, resulting in difficult assembling and maintenance of the apparatus. In addition, since a plane of polarized light is also rotated together with rotation of the laser light, it is difficult to generate linearly polarized laser light.

Furthermore, as the number of mirrors used increases, if any one of mirrors has a slight angular error, an angle of the optical axis in the optical resonator may be synergistically changed depending on the number of the mirrors, thereby rendering the laser output unstable. In addition, as the number of mirrors used increases, a larger number of mirror holders, each having an angular adjustment mechanism to hold and adjust the mirror, are required, resulting in increased manufacturing cost and an larger size of the apparatus.

It is an object of the present invention to provide a laser oscillator capable of compensating anisotropy of optical characteristics in a laser medium, and stably generating linearly polarized laser light having excellent isotropy in a simple manner.

It is another object of the present invention to provide a laser amplifier capable of compensating anisotropy of optical characteristics in a laser medium, and stably amplifying linearly polarized laser light having excellent isotropy in a simple manner.

Means for Solving the Problem

In order to achieve the above object, according to a first aspect of the present invention, a transverse flow type laser oscillator includes:

a reciprocating type optical resonator having a reflecting mirror and an output mirror;

a laser medium for amplifying light, provided in the optical resonator; and a polarization selecting element for controlling the oscillated light to linear polarization, provided in the optical resonator;

wherein the reflecting mirror is an orthogonal mirror having two reflecting surfaces orthogonal to each other, and the polarization selecting element is arranged such that a polarization direction of the oscillated light is parallel to a reference axis set in a plane perpendicular to an optical axis of the optical resonator, the orthogonal mirror is arranged such that the polarization direction of the oscillated light is parallel to a valley line of the orthogonal mirror, a laser gas flow direction is set in a first direction perpendicular to the optical axis of the optical resonator, and a discharge direction is set in a second direction perpendicular to the optical axis and the first direction, and the reference axis is arranged to intersect with the discharge direction at an angle of 45 degrees.

According to a second aspect of the present invention, a transverse flow type laser oscillator includes:

a reciprocating type optical resonator having a reflecting mirror and an output mirror;

a laser medium for amplifying light, provided in the optical resonator; and a polarization selecting element for controlling the oscillated light to linear polarization, provided in the optical resonator;

wherein the reflecting mirror is an orthogonal mirror having two reflecting surfaces orthogonal to each other, and the polarization selecting element is arranged such that a polarization direction of the oscillated light is parallel to a reference axis set in a plane perpendicular to an optical axis of the optical resonator, the orthogonal mirror is arranged such that the polarization direction of the oscillated light is perpendicular to a valley line of the orthogonal mirror, a laser gas flow direction is set in a first direction perpendicular to the optical axis of the optical resonator, and a discharge direction is set in a second direction perpendicular to the optical axis and the first direction, and the reference axis is arranged to intersect with the discharge direction at an angle of 45 degrees.

According to a third aspect of the present invention, a transverse flow type laser oscillator includes:

a reciprocating type optical resonator having a reflecting mirror and an output mirror;

a laser medium for amplifying light, provided in the optical resonator; and a polarization selecting element for controlling the oscillated light to linear polarization, provided in the optical resonator;

wherein the reflecting mirror is an orthogonal mirror having two reflecting surfaces orthogonal to each other, and the polarization selecting element is arranged such that a polarization direction of the oscillated light is parallel to a reference axis set in a plane perpendicular to an optical axis of the optical resonator, a reflective film for inducing a phase difference corresponding to one-fourth of a wavelength between P-polarization and S-polarization is applied on the respective reflecting surfaces of the orthogonal mirror, a laser gas flow direction is set in a first direction perpendicular to the optical axis of the optical resonator, and a discharge direction is set in a second direction perpendicular to the optical axis and the first direction, and the reference axis is arranged to intersect with the discharge direction at an angle of 45 degrees.

According to a fourth aspect of the present invention, a transverse flow type laser amplifier includes:

a bending mirror for reflecting linearly polarized laser light traveling along a predetermined optical axis so as to travel again along the same optical axis; and a laser medium for amplifying the laser light traveling along the optical axis;

wherein the bending mirror is an orthogonal mirror having two reflecting surfaces orthogonal to each other, the orthogonal mirror is arranged such that a valley line of the orthogonal mirror is parallel to a reference axis set in a plane perpendicular to the optical axis, and the polarization direction of the laser light is set at an angle of 45 degrees with respect to the valley line of the orthogonal mirror, a laser gas flow direction is set in a first direction perpendicular to the optical axis of the optical resonator, and a discharge direction is set in a second direction perpendicular to the optical axis and the first direction, and the reference axis is arranged to intersect with the discharge direction at an angle of 45 degrees.

Effect of the Invention

According to the present invention, while the laser light travels along the outward and homeward paths, the intensity distribution of the laser light can be rotated to a desired angle around the optical axis, depending on the installation angle of the orthogonal mirror. Consequently, even when the laser medium has a spatially asymmetric gain distribution, it has less influence on optical characteristics of the laser light, thereby stably generating or amplifying the linearly polarized laser light having excellent isotropy.

EMBODIMENT FOR CARRYING OUT THE INVENTION (Embodiment 1)

Figure 1:
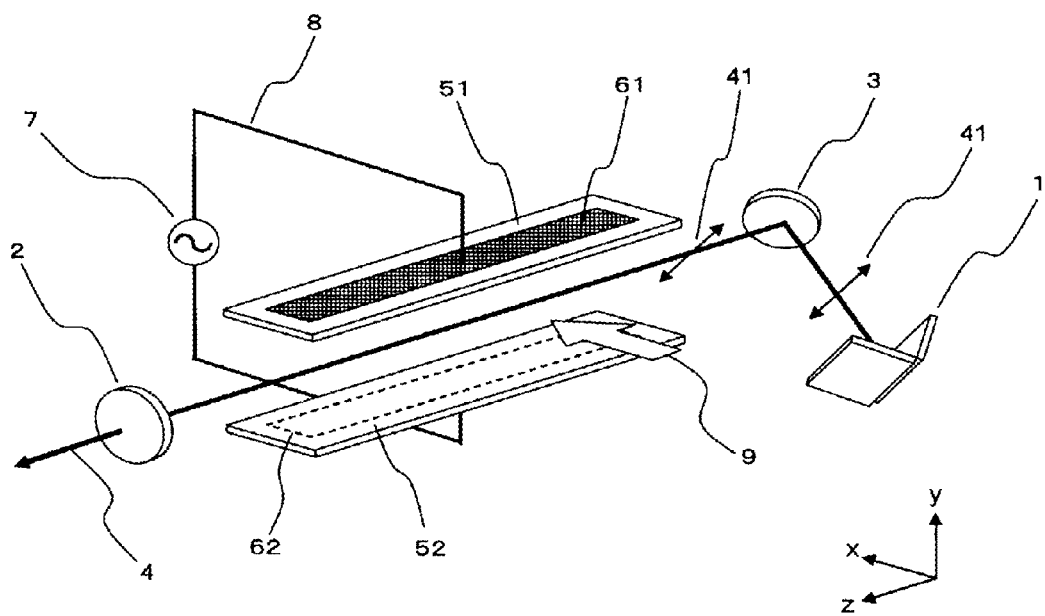
FIG. 1 is a perspective view showing Embodiment 1 of the present invention.

FIG. 1 is a perspective view showing Embodiment 1 of the present invention. A laser oscillator includes an optical resonator having an orthogonal mirror 1 and a partial reflection mirror 2, a laser gas acting as a laser medium, which is supplied between discharge electrodes 61 and 62, and a 90-degree folding mirror 3 acting as a polarization selecting element.

Here, for easy understanding, a transverse flow (3-axis cross flow) type gas laser oscillator will be described by way of example, in which a laser gas flow direction is set in x-direction, a discharge direction of the discharge electrodes 61 and 62 is set in y-direction, and an optical axis between the partial reflection mirror 2 and the 90-degree folding mirror 3 is set in z-direction.

The partial reflection mirror 2 functions as an output mirror which brings out a part of laser light oscillated in the optical resonator as laser light 4. The orthogonal mirror 1, which is located at one end of the optical resonator, has two reflecting surfaces orthogonal to each other. Here, the line at which the reflecting surfaces intersect with each other is referred to as a "valley line" in this specification.

The 90-degree folding mirror 3 folds the optical axis of the optical resonator along the way by 90 degrees, and its reflecting surface is applied with a reflective film so that when light enters the reflecting surface with an incidence angle of 45 degrees, a reflectance of the S-polarization component (i.e., polarization component vertical to the optical incident plane) is higher than a reflectance of the P-polarization component (i.e., polarization component parallel to the optical incident plane). Therefore, when laser oscillation is generated in the optical resonator, an optical loss of the P-polarization is increased greater than an optical loss of the S-polarization, and as a result, linearly polarized laser light having a polarization direction shown by numeral 41 is selectively oscillated.

In this embodiment, the orthogonal mirror 1 is arranged such that the valley line of the orthogonal mirror 1 is parallel to the polarization direction 41 of the laser light.

The discharge electrodes 61 and 62 are provided on back surfaces opposite to facing surfaces of dielectric plates 51 and 52, respectively, and both connected through electric supply lines 8 to a high-frequency power supply 7. When an alternating voltage is applied between the discharge electrodes 61 and 62, a uniform glow discharge occurs. A laser gas is supplied between the discharge electrodes 61 and 62 in a direction shown by arrow 9. When molecules or atoms of the laser gas are excited to a laser upper level by the glow discharge, light can be amplified. For example, when a mixture gas containing $CO_2$ molecules is used as the laser gas, a laser oscillated light having a wavelength of 10.6 μm can be generated due to transition of $CO_2$ molecules between vibration levels.

Figure 2:
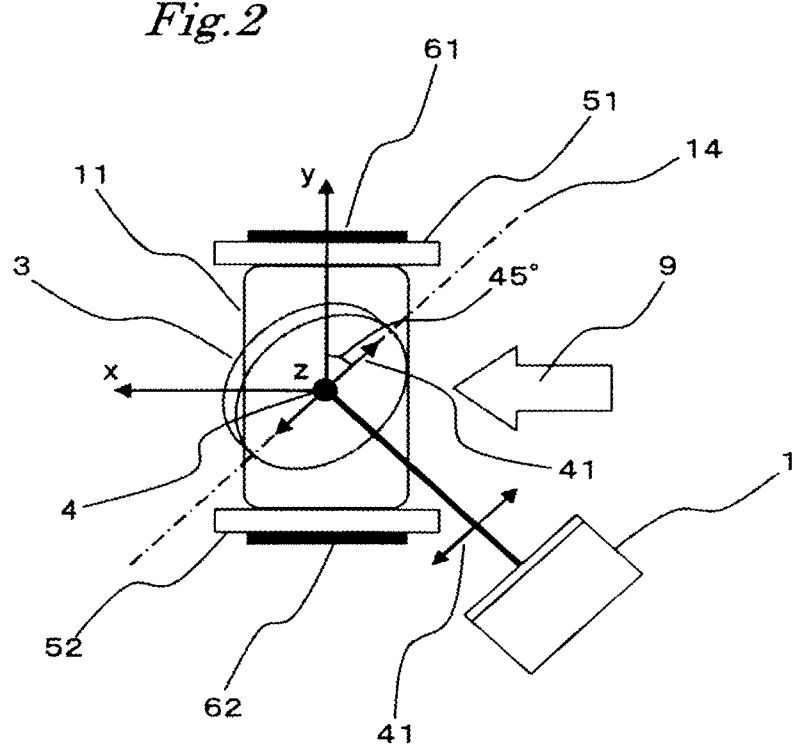
FIG. 2 is an explanatory diagram showing an arrangement relationship when viewing a 90-degree folding mirror 3 along an optical axis direction of an optical resonator in FIG. 1.

FIG. 2 is an explanatory diagram showing an arrangement relationship when viewing the 90-degree folding mirror 3 from the partial reflection mirror 2 toward the −z direction in FIG. 1. The glow discharge 11 is generated between the discharge electrodes 61 and 62, where the discharge direction is oriented in y-direction in x-y plane perpendicular to the optical axis, and a reference axis 14 is set in a direction of an angle of 45 degrees with respect to y-direction. Thus, an installation angle of the 90-degree folding mirror 3 is set such that the polarization direction 41 of the laser oscillated light is parallel to the reference axis 14. Furthermore, an installation angle of the orthogonal mirror 1 is set such that the polarization direction 41 of the laser oscillated light traveling along the optical axis which is folded by 90 degrees by the 90-degree folding mirror 3 is parallel to the valley line of the orthogonal mirror 1.

Figure 3:
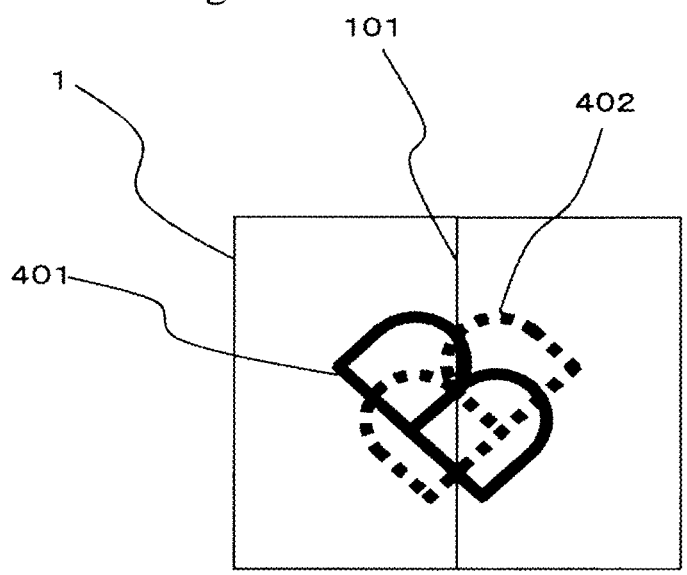
FIG. 3 is an explanatory diagram showing an optical action of an orthogonal mirror 1.

FIG. 3 is an explanatory diagram showing an optical action of the orthogonal mirror 1. Here, for easy understanding, it is assumed that an intensity distribution of incident light 401 has a B-shaped cross section which is inclined by 45 degrees to the left side from the valley line 101. The incident light 401 travels toward the valley line 101 of the orthogonal mirror 1, and collides with two reflecting surfaces thereof. At this time, light reflected from the left reflecting surface is reflected again from the right reflecting surface and travels back from the sheet of drawing. On the other hand, light reflected from the right reflecting surface is reflected again from the left reflecting surface and travels back from the sheet of drawing. Thus, outgoing light 402 is inverted in an axisymmetric manner with respect to the valley line 101, resulting in a cross-sectional shape having a mirror-image of B-shape which is inclined by 45 degrees to the right side from the valley line 101.

Therefore, by arbitrarily setting the installation angle of the valley line 101 of the orthogonal mirror 1 with respect to the incident light 401, the outgoing light 402 which is the mirrored symmetric image of the incident light 401 can be rotated to any angle.

Referring again to FIG. 2, the reference axis 14 is set in the direction of the angle of 45 degrees with respect to y-axis, and the polarization direction 41 of the laser light is set to be parallel to the reference axis 14, and the valley line of the orthogonal mirror 1 is set to be parallel to the polarization direction 41.

The outward laser light traveling from the partial reflection mirror 2 in −z direction is reflected from the 90-degree folding mirror 3, and then enters the orthogonal mirror 1, and then inverted in an axisymmetric manner with respect to the valley line 101, and then reflected back from the 90-degree folding mirror 3, resulting in homeward laser light traveling toward z-direction. This homeward laser light has been inverted in an axisymmetric manner with respect to the reference axis 14, as compared to the outward laser light. In this case, with respect to y-axis the homeward laser light has an image which is equal to that obtained by rotating the mirrored symmetric image of the outward laser light by 90 degrees around the optical axis.

Meanwhile, since the valley line 101 of the orthogonal mirror 1 is set to be parallel to the polarization direction 41 of the linearly polarized light, the polarization direction is not changed by the reflective action of the orthogonal mirror 1. It does not depend on a rotation angle of the outward laser light.

Therefore, the polarization direction 41 of the linearly polarized light can be kept constant before and after entering orthogonal mirror 1.

Figure 4:
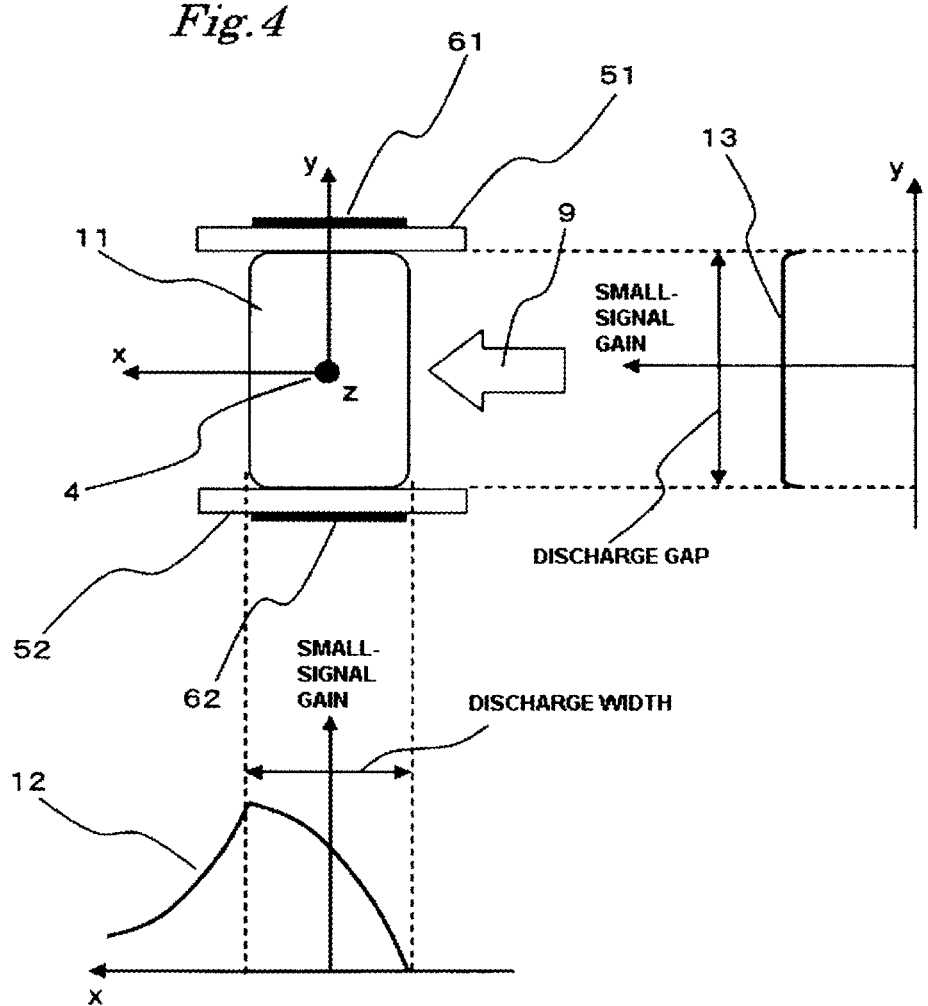
FIG. 4 is an explanatory diagram showing a small-signal gain distribution of a laser medium.

FIG. 4 is an explanatory diagram showing a small-signal gain distribution of the laser medium. In x-y plane perpendicular to the optical axis, the glow discharge direction is set in y-direction, and the direction of the gas flow is set in x-direction. The small-signal gain distribution shows a substantially constant distribution along y-direction, but a large change along x-direction. This is because while the laser gas passes through the glow discharge 11, the laser upper level is gradually accumulated with gain as the passing time is increased. As a result, the small-signal gain has a mound-shaped distribution that exhibits a lower gain on the upstream side of gas and a higher gain on the downstream side of gas and a gradually reduced gain outside the glow discharge 11.

Thus, it can be seen in the transverse flow type gas laser oscillator that a small-signal gain distribution 13 along y-direction is quite different from a small-signal gain distribution 12 along x-direction.

Figure 5:
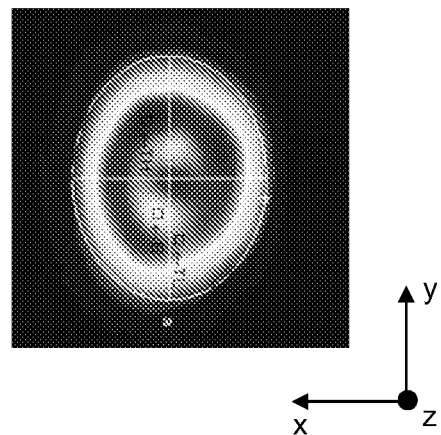
FIG. 5 is an image showing an intensity distribution of laser light generated from a conventional laser oscillator having an optical resonator composed of spherical mirrors.
Figure 6:
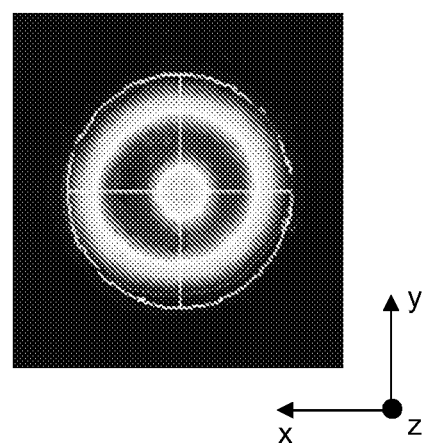
FIG. 6 is an image showing an intensity distribution of laser light generated from a laser oscillator according to Embodiment 1.

FIG. 5 is an image showing an intensity distribution of the laser light generated from the conventional laser oscillator having an optical resonator composed of spherical mirrors. FIG. 6 is an image showing an intensity distribution of the laser light generated from the laser oscillator according to Embodiment 1. In the conventional laser oscillator, as described in FIG. 4, it is found that a higher-order transverse mode is generated in y-direction compared to x-direction due to the great influence of the uniform small-signal gain distribution along y-direction.

Meanwhile, in the laser oscillator according to this embodiment, since with respect to y-axis the homeward laser light has an image which is equal to that obtained by rotating the mirrored symmetric image of the outward laser light by 90 degrees around the optical axis, the influence of the small-signal gain distribution 13 along y-direction and the influence of the small-signal gain distribution 12 along x-direction are averaged. As a result, as shown in FIG. 6, the higher-order transverse mode can be suppressed in both of x-direction and y-direction, so that linearly polarized laser light having excellent isotropy can be stably generated.

In addition, in this embodiment the orthogonal mirror 1 is arranged such that the valley line of the orthogonal mirror 1 is parallel to the polarization direction 41 of the laser light. Therefore, the polarization direction is kept constant before and after entering the orthogonal mirror 1, so that the linear polarized light oscillation can be surely maintained in the optical resonator. In a case where light obliquely enters a general material whose surface is composed of a mirror surface, it is well known that a reflectance of the S-polarization component is higher than that of the P-polarization. In this embodiment, since the laser light always enters the orthogonal mirror 1 with S-polarization, it is advantageous that a higher reflectance can be easily achieved, and selectivity of the linearly polarized light is further improved, and a higher degree of polarization can be maintained, as compared to other configurations in which laser light enters with P-polarization.

Furthermore, even when the orthogonal mirror 1 has an angular error with respect to the valley line 101, no angular error occurs between the light incident to the orthogonal mirror 1 and the light reflected therefrom due to the optical characteristics thereof. Therefore, as compared to the conventional laser oscillator in which a plane mirror or spherical mirror is used as an end mirror of the optical resonator, any misalignment of the optical axis caused by disturbance such as machine vibration is not likely to be generated, thereby making less influence on the laser output so that stability of the laser output is improved. As a result, alignment sensitivity of the optical resonator is reduced, and the optical axis can be further easily adjusted.

(Embodiment 2)

In this embodiment, it will be described below that the angle of the reference axis 14 can be arbitrarily set in Embodiment 1. In Embodiment 1 as described above, for easy understanding, it is described by way of an example that the reference axis 14 is set in the direction of the angle of 45 degrees with respect to the discharge direction (i.e., y-direction) of the discharge electrodes 61 and 62 in x-y plane perpendicular to the optical axis.

However, the reference axis 14 may be set in a direction of any angle other than 45 degrees with respect to y-direction, and the reference axis 14 is preferably set at an angle so that the effect of inhomogeneity in optical characteristics, such as the small-signal gain or refractive index in the laser medium, can be minimized.

Figure 7:
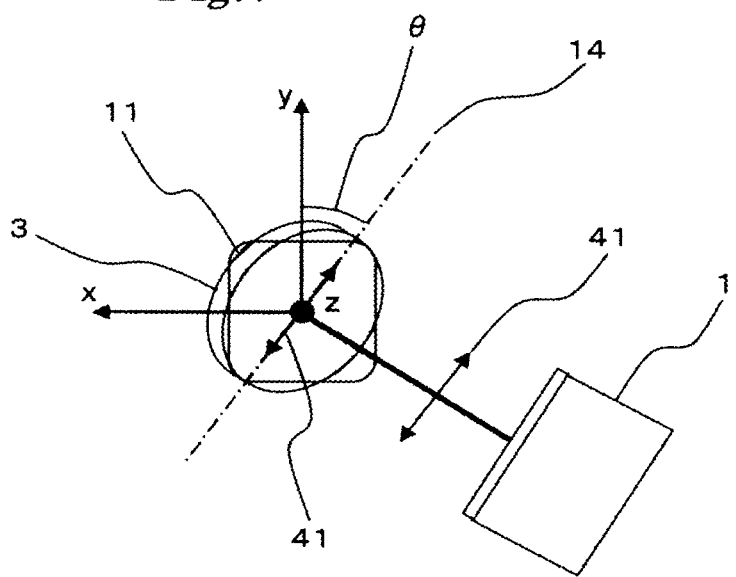
FIG. 7 is an explanatory diagram showing an arrangement relationship when viewing the 90-degree folding mirror 3 along the optical axis direction of the optical resonator in Embodiment 2.

For example, as shown in FIG. 7, in a case where the reference axis 14 is set in a direction of an angle θ respect to y-direction in x-y plane perpendicular to the optical axis, the same effect as that of Embodiment 1 can be achieved by adjusting the installation angle of the 90-degree folding mirror 3, selecting the linearly polarized light 41 whose polarization direction is parallel to the reference axis 14, and installing the orthogonal mirror 1 so that the linearly polarized light 41 is parallel to the valley line.

(Embodiment 3)

Figure 8:
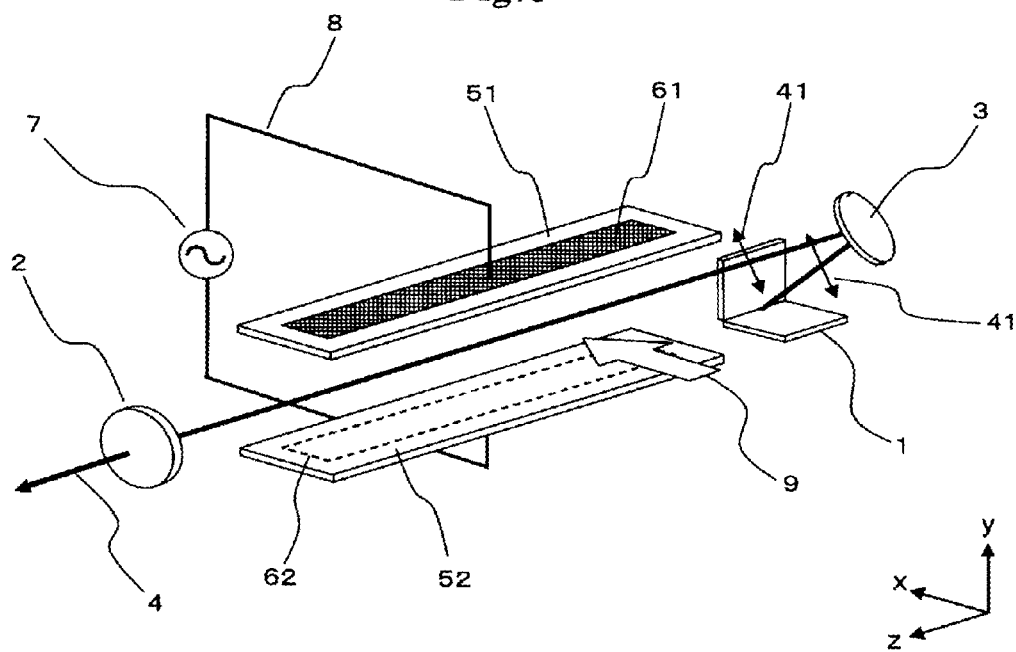
FIG. 8 is a perspective view showing Embodiment 3 of the present invention.

FIG. 8 is a perspective view showing Embodiment 3 of the present invention. A laser oscillator includes an optical resonator having the orthogonal mirror 1 and the partial reflection mirror 2, a laser gas acting as a laser medium, which is supplied between the discharge electrodes 61 and 62, and the 90-degree folding mirror 3 acting as a polarization selecting element.

Here, for easy understanding, a transverse flow (3-axis cross flow) type gas laser oscillator will be described by way of example, in which a laser gas flow direction is set in x-direction, a discharge direction of the discharge electrodes 61 and 62 is set in y-direction, and an optical axis between the partial reflection mirror 2 and the 90-degree folding mirror 3 is set in z-direction.

Since the respective components in this embodiment are the same as those of Embodiment 1, redundant description is not omitted. In this embodiment, the orthogonal mirror 1 is arranged such that the valley line thereof is perpendicular to the polarization direction 41 of the laser light.

Figure 9:
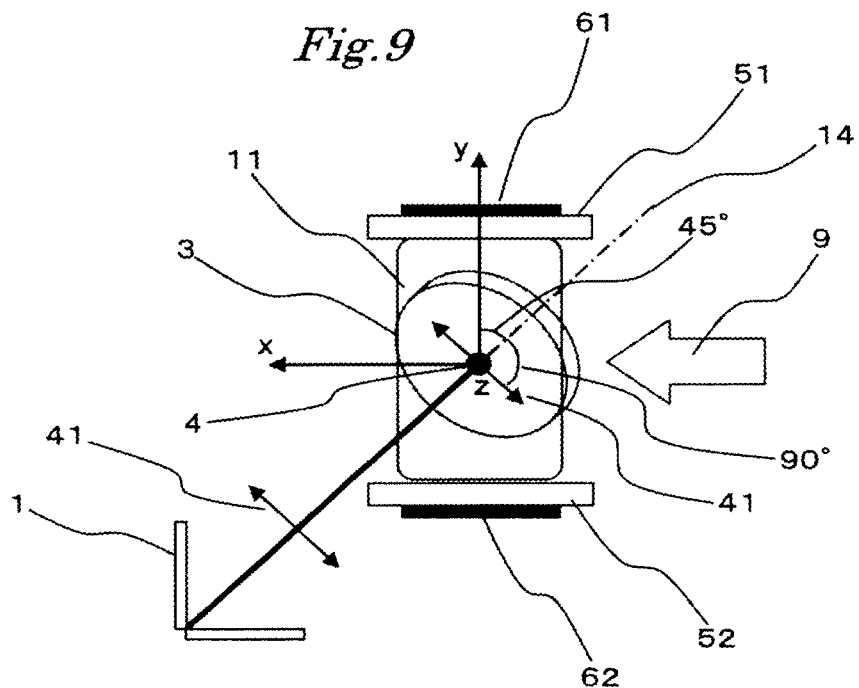
FIG. 9 is an explanatory diagram showing an arrangement relationship when viewing the 90-degree folding mirror 3 along the optical axis direction of the optical resonator in FIG. 8.

FIG. 9 is an explanatory diagram showing an arrangement relationship when viewing the 90-degree folding mirror 3 from the partial reflection mirror 2 toward −z direction in FIG. 8. The glow discharge is generated between the discharge electrodes 61 and 62, where the discharge direction is oriented in y-direction in x-y plane perpendicular to the optical axis, and the reference axis 14 is set in a direction of an angle of 45 degrees with respect to y-direction. Thus, an installation angle of the 90-degree folding mirror 3 is set such that the polarization direction 41 of the laser oscillated light is perpendicular to the reference axis 14. Furthermore, an installation angle of the orthogonal mirror 1 is set such that the polarization direction 41 of the laser oscillated light traveling along the optical axis which is folded by 90 degrees by the 90-degree folding mirror 3 is perpendicular to the valley line of the orthogonal mirror 1.

The outward laser light traveling from the partial reflection mirror 2 to −z direction is reflected from the 90-degree folding mirror 3, and then enters the orthogonal mirror 1, and then inverted in an axisymmetric manner with respect to the valley line of the orthogonal mirror 1, and then reflected back from the 90-degree folding mirror 3, resulting in homeward laser light traveling toward z-direction. This homeward laser light has been inverted in an axisymmetric manner with respect to the reference axis 14, as compared to the outward laser light. In this case, with respect to y-axis the homeward laser light has an image which is equal to that obtained by rotating the mirrored symmetric image of the outward laser light by 90 degrees around the optical axis. Therefore, as shown in FIG. 6, the influence of the small-signal gain distribution 13 along y-direction and the influence of the small-signal gain distribution 12 along x-direction are averaged. As a result, the higher-order transverse mode can be suppressed in both of x-direction and y-direction, so that linearly polarized laser light having excellent isotropy can be stably generated.

Meanwhile, since the valley line 101 of the orthogonal mirror 1 is set to be perpendicular to the polarization direction 41 of the linearly polarized light, the polarization direction is not changed by the reflective action of the orthogonal mirror 1. It does not depend on a rotation angle of the outward laser light. Therefore, the polarization direction 41 of the linearly polarized light can be kept constant before and after entering orthogonal mirror 1, and the linearly polarized light oscillation can be surely maintained in the optical resonator.

Furthermore, even when the orthogonal mirror 1 has an angular error with respect to the valley line 101, no angular error occurs between the light incident to the orthogonal mirror 1 and the light reflected therefrom due to the optical characteristics thereof. Therefore, any misalignment of the optical axis caused by disturbance such as machine vibration is not likely to be generated, thereby making less influence on the laser output so that stability of the laser output is improved. As a result, alignment sensitivity of the optical resonator is reduced, and the optical axis can be further easily adjusted.

(Embodiment 4)

In this embodiment, it will be described below that the angle of the reference axis 14 can be arbitrarily set in Embodiment 3. In Embodiment 3 as described above, for easy understanding, it is described by way of an example that the reference axis 14 is set in the direction of the angle of 45 degrees with respect to the discharge direction (i.e., y-direction) of the discharge electrodes 61 and 62 in x-y plane perpendicular to the optical axis.

However, the reference axis 14 may be set in a direction of any angle other than 45 degrees with respect to y-direction, and the reference axis 14 is preferably set at an angle so that the effect of inhomogeneity in optical characteristics, such as the small-signal gain or refractive index in the laser medium, can be minimized.

Figure 10:
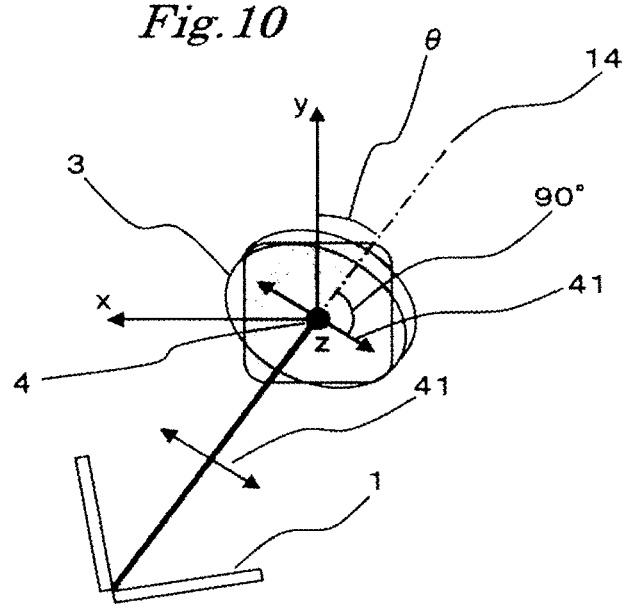
FIG. 10 is an explanatory diagram showing an arrangement relationship when viewing the 90-degree fold mirror 3 along the optical axis direction of the optical resonator in Embodiment 4.

For example, as shown in FIG. 10, in a case where the reference axis 14 is set in a direction of an angle θ respect to y-direction in x-y plane perpendicular to the optical axis, the same effect as that of Embodiment 3 can be achieved by adjusting the installation angle of the 90-degree folding mirror 3, selecting the linearly polarized light 41 whose polarization direction is perpendicular to the reference axis 14, and installing the orthogonal mirror 1 so that the linearly polarized light 41 is perpendicular to the valley line.

(Embodiment 5)

Figure 11:
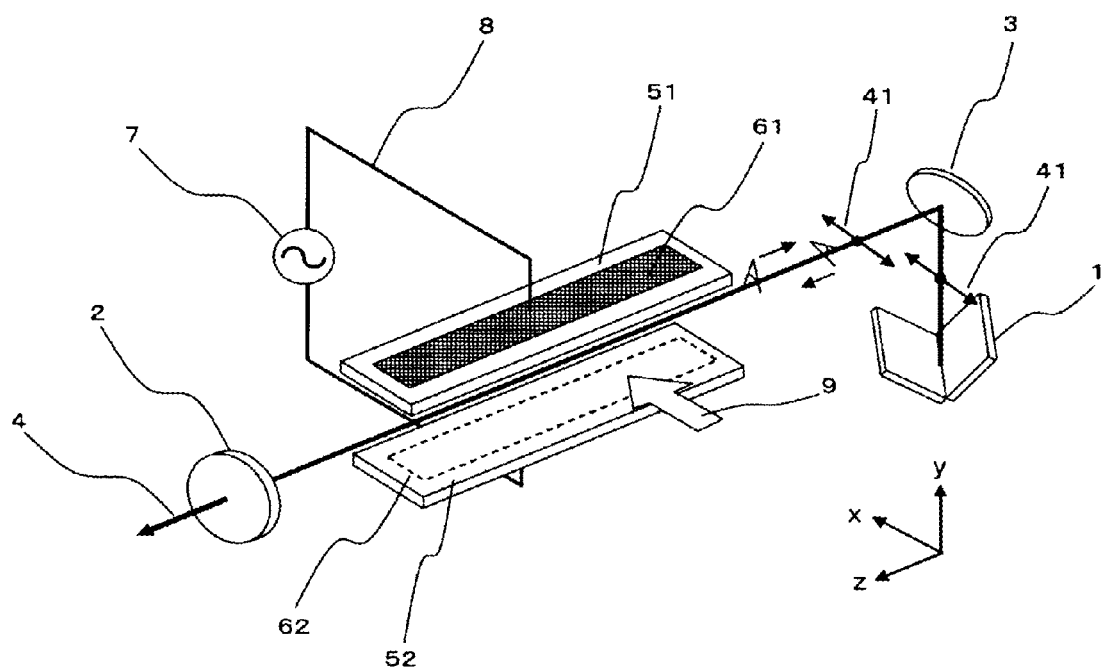
FIG. 11 is a perspective view showing Embodiment 5 of the present invention.

FIG. 11 is a perspective view showing Embodiment 5 of the present invention. A laser oscillator includes an optical resonator having the orthogonal mirror 1 and the partial reflection mirror 2, a laser gas acting as a laser medium, which is supplied between the discharge electrodes 61 and 62, and the 90-degree folding mirror 3 acting as a polarization selecting element.

Here, for easy understanding, a transverse flow (3-axis cross flow) type gas laser oscillator will be described by way of example, in which a laser gas flow direction is set in x-direction, a discharge direction of the discharge electrodes 61 and 62 is set in y-direction, and an optical axis between the partial reflection mirror 2 and the 90-degree folding mirror 3 is set in z-direction.

Since the respective components in this embodiment are the same as those of Embodiment 1, redundant description is not omitted. In this embodiment, the reflecting surfaces of the orthogonal mirror 1 are provided with a reflective film for inducing a phase difference corresponding to one-fourth of a wavelength between P-polarization and S-polarization of the laser light having an incidence angle of 45 degrees. In addition, the 90-degree folding mirror 3 folds the optical axis of the optical resonator by 90 degrees in −y direction, and selects the linearly polarized light 41 parallel to x-direction before and after the folding reflection. In addition, the orthogonal mirror 1 is arranged so that the polarization direction of the oscillated light is oriented at an angle of 45 degrees with respect to the valley line of the orthogonal mirror 1.

Figure 12:
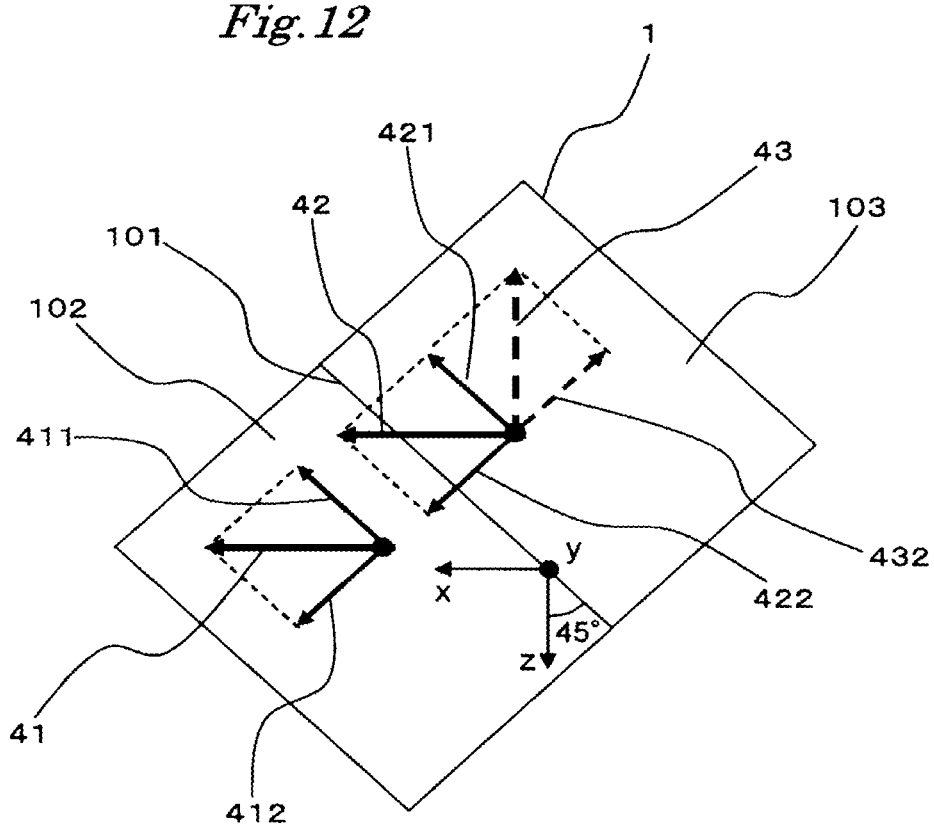
FIG. 12 is an explanatory diagram showing an optical action of the orthogonal mirror 1.

FIG. 12 is an explanatory diagram showing an optical action of the orthogonal mirror 1 according to this embodiment. We can consider that the linearly polarized light 41 entering the orthogonal mirror 1 can be split into a component 411 which enters a first reflecting surface 102 of the orthogonal mirror 1 as S-polarization and a component 412 which enters it as P-polarization.

Here, we assume that the respective reflecting surfaces of the orthogonal mirror 1 are provided with a normal reflective film which induces no phase difference between the S-polarization component 411 and the P-polarization component 412. As described above, the P-polarization component 412 is inverted in an axisymmetric manner with respect to the valley line 101 in a direction as shown by arrow 432 due to the reflective action of the orthogonal mirror 1. Meanwhile, the S-polarization component 411 parallel to the valley line 101 can be also maintained on a second reflecting surface 103 as shown by arrow 421 to have the S-polarization component 411 entering the first reflecting surface 102. As a result, the polarization direction of the linearly polarized light 41 incident on the first reflection surface 102 will have a resultant vector of the S-polarization component 421 and the P-polarization component 432 with the polarization direction being changed as shown by arrow 43. In other words, the polarization direction is also inverted in an axisymmetric manner with respect to the valley line 101 of the orthogonal mirror 1.

Meanwhile, according to this embodiment, in the case where the reflective film which induces a phase difference corresponding to one-fourth of the wavelength between the P-polarization and the S-polarization is applied onto the reflecting surfaces of the orthogonal mirror 1, a phase difference corresponding to a half of the wavelength is induced between the P-polarization and the S-polarization due to two reflecting actions on the first reflecting surface 102 and the second reflecting surface 103. Therefore, in the case where the normal reflection film which induces no phase difference between the P-polarization and the S-polarization is provided, the direction of the P-polarization outgoing from the second reflecting surface 103 is oriented in such a direction as shown by arrow 432. Meanwhile, according to this embodiment, in the case where the reflection film which induces a phase difference of one-fourth of the wavelength between the P-polarization and the S-polarization is provided, the direction of the P-polarization outgoing from the second reflecting surface 103 is inverted in such a direction as shown by arrow 422. Therefore, the polarization direction of the laser light outgoing from the second reflecting surface 103, i.e., a resultant vector of the P-polarization and the S-polarization is oriented in such a direction as shown by arrow 42, and it is found that the polarization direction 41 of the laser light entering the orthogonal mirror 1 can be maintained.

Referring back to FIG. 11, the outward laser light traveling from the partial reflection mirror 2 to −z direction is reflected from the 90-degree folding mirror 3, and then enters the orthogonal mirror 1, and then inverted in an axisymmetric manner with respect to the valley line of the orthogonal mirror 1, and then reflected back from the 90-degree folding mirror 3, resulting in homeward laser light traveling toward z-direction. This homeward laser light has been inverted in an axisymmetric manner with respect to the reference axis 14, as compared to the outward laser light. In this case, with respect to y-axis the homeward laser light has an image which is equal to that obtained by rotating the mirrored symmetric image of the outward laser light by 90 degrees around the optical axis. Therefore, as shown in FIG. 6, the influence of the small-signal gain distribution 13 along y-direction and the influence of the small-signal gain distribution 12 along x-direction are averaged. As a result, the higher-order transverse mode can be suppressed in both of x-direction and y-direction, so that linearly polarized laser light having excellent isotropy can be stably generated.

In addition, the reflective film for inducing a phase difference corresponding to one-fourth of the wavelength between the P-polarization and the S-polarization of the laser light having an incidence angle of 45 degrees is applied onto the reflecting surfaces of the orthogonal mirror 1. Therefore, linear polarization having a constant direction can be always maintained without depending on the polarization direction of the linearly polarized light entering the orthogonal mirror 1. Incidentally, it is described in this embodiment that the linearly polarized light 41 enters the orthogonal mirror 1 at an angle of 45 degrees with respect to the valley line 101 thereof, but the angle of the linearly polarized light 41 with respect to the valley line 101 is not limited to the above. The constant polarization direction can be maintained between the incident light and the reflected light without depending on the angle of the incident linearly polarized light 41. As a result, linear polarization having a desired arbitrary direction can be selected without depending on the installation angle of the orthogonal mirror 1, so that the laser light 4 can be further easily handled by selecting an optimal polarization direction according to applications.

Incidentally, in this embodiment, the polarization direction parallel to x-direction is selected, and the direction of the valley line of the orthogonal mirror 1 is arranged at an angle of 45 degrees with respect to z-axis, but the polarization direction to be selected and the angle of the orthogonal mirror are not limited to the above. That is, by using the orthogonal mirror 1 provided with the reflective film for inducing a phase difference corresponding to one-fourth of the wavelength between the P-polarization and the S-polarization, the inversion direction of the image caused by the orthogonal mirror 1 and the direction of the linear polarization can be arbitrarily and independently selected. Therefore, it is only necessary to set the angle of the valley line of the orthogonal mirror 1 to an angle so that the effect of inhomogeneity in the optical characteristics, such as the small-signal gain or refractive index in the laser medium, can be minimized, and to select the polarization direction of the laser light in a direction optimal for applications.

Incidentally, the polarization direction of linear polarization is selected by use of the 90-degree folding mirror 3 in Embodiments 1 to 5, but the method for selecting the linear polarization is not limited to the above, and any polarization optical element, such as a normal polarizer, Brewster plate, etc., may be used.

(Embodiment 6)

Figure 13:
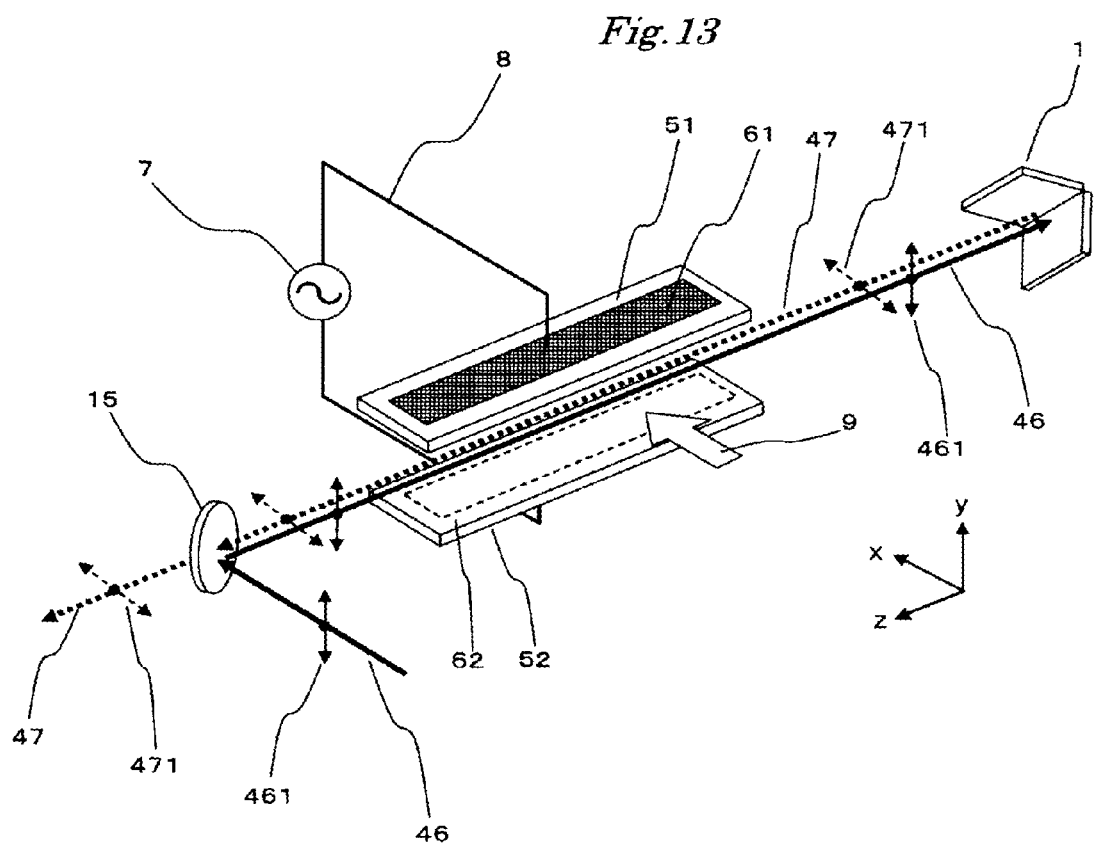
FIG. 13 is a perspective view showing Embodiment 6 of the present invention.

FIG. 13 is a perspective view showing Embodiment 6 of the present invention. A laser amplifier includes a polarization beam splitter 15 which reflects vertically polarized laser light and transmits horizontally polarized laser light, the orthogonal mirror 1 to reflect the laser light reflected from the polarization beam splitter 15 along the same optical axis, and a laser gas acting as a laser medium, which is supplied between the discharge electrodes 61 and 62.

Here, for easy understanding, a transverse flow (3-axis cross flow) type gas laser amplifier will be described by way of example, in which a laser gas flow direction is set in x-direction, a discharge direction of the discharge electrodes 61 and 62 is set in y-direction, and an optical axis between the polarization beam splitter 15 and the orthogonal mirror 1 is set in z-direction.

The discharge electrodes 61 and 62 are provided on back surfaces opposite to facing surfaces of dielectric plates 51 and 52, respectively, and both connected through electric supply lines 8 to a high-frequency power supply 7. When an alternating voltage is applied between the discharge electrodes 61 and 62, a uniform glow discharge occurs. A laser gas is supplied between the discharge electrodes 61 and 62 in a direction shown by arrow 9. When molecules or atoms of the laser gas are excited to a laser upper level by the glow discharge, light can be amplified. For example, when a mixture gas containing $CO_2$ molecules is used as the laser gas, a laser oscillated light having a wavelength of 10.6 μm can be generated due to transition of $CO_2$ molecules between vibration levels.

In this embodiment, the discharge direction is set in y-direction in x-y plane perpendicular to the optical axis, and a reference axis is set in a direction of an angle of 45 degrees with respect to y-direction. Thus, the orthogonal mirror 1 is arranged so that the valley line thereof is parallel to the reference axis, and the polarization direction of the laser light is oriented at 45 degrees with respect to the valley line of the orthogonal mirror 1.

An outward laser light 46 to be amplified, which has a linear polarization in such a direction as shown by arrow 461, that is, y-direction, enters the polarization beam splitter 15 as S-polarization, and then its traveling direction is folded at 90 degrees, and then amplified while passing through the laser gas which is excited by discharge between the discharge electrodes 61 and 62. Then, the amplified laser light is reflected back from the orthogonal mirror 1 along the same optical axis. Here, the valley line of the orthogonal mirror 1 is set in a direction of an angle of 45 degrees with respect to y-direction, i.e., the discharge direction, and also set at an angle of 45 degrees with respect to the polarization direction 461 of the outward laser light 46. Due to image inversion effect of the orthogonal mirror 1, a polarization direction 471 of a homeward laser light 47 has been rotated by 90 degrees with respect to the polarization direction 461 of the outward laser light 46, to be parallel to x-direction, and then amplified again while passing through the laser gas which is excited by discharge between the discharge electrodes 61 and 62. The homeward laser light 47 passes through the polarization beam splitter 15 with P-polarization, and supplied to the outside.

Thus, by setting the linear polarization direction of the laser light at 45 degrees with respect to the valley line of the orthogonal mirror 1, the polarization direction of the laser light can be rotated by 90 degrees with a simpler configuration without using a polarization optical element, such as a wave plate or polarization rotator. Therefore, the reciprocating type laser amplifier, in which the outward laser light 46 and the homeward laser light 47 can be split by the polarization beam splitter 15, can be achieved.

In addition, since the orthogonal mirror 1 is a reflective optical element, an effect of distortion of the optical element caused by optical absorption can be reduced, as compared to a case where a polarization optical element such as a transmissive wave plate or polarization rotator is used. Also the reciprocating type laser amplifier can be configured at lower cost, as compared to a case where a polarization optical element using birefringence is used.

Further, in the case where the valley line of the orthogonal mirror 1 is set in the direction of an angle of 45 degrees with respect to y-direction, i.e., discharge direction, when the laser light reciprocates in the laser gas, as shown in FIG. 6, the influence of the small-signal gain distribution 13 along y-direction and the influence of the small-signal gain distribution 12 along x-direction are averaged. As a result, the linearly polarized laser light having excellent isotropy can be stably amplified.

Incidentally, as long as the angular relationship of 45 degrees is maintained between the valley line of the orthogonal mirror 1 and the polarization direction of the laser light, the reference axis parallel to the valley line of the orthogonal mirror 1 may be set in a direction of an angle other than the angle of 45 degrees with respect to y-direction, i.e., discharge direction, and it is preferably set at an angle so that the effect of inhomogeneity in optical characteristics, such as the small-signal gain or refractive index in the laser medium, can be minimized.

In the above embodiments, the transverse flow type gas laser oscillator or amplifier is described by way of example. But even when an axial-flow type gas laser in which a laser optical axis and a gas flow are coaxially provided, or a solid-state laser medium is used, similar effect can be obtained by optimally selecting the installation angle of the orthogonal mirror and the polarization direction.

INDUSTRIAL APPLICABILITY

The present invention is very useful in industry in that linearly polarized laser light having excellent isotropy can be stably generated.

EXPLANATORY NOTE

1: ORTHOGONAL MIRROR, 2: PARTIAL REFLECTION MIRROR, 3: 90-DEGREE FOLDING MIRROR, 4: LASER LIGHT, 7: HIGH FREQUENCY POWER SUPPLY, 8: ELECTRIC SUPPLY LINE, 9: DIRECTION OF GAS FLOW, 11: GLOW DISCHARGE, 12: SMALL-SIGNAL GAIN DISTRIBUTION ALONG X DIRECTION, 13: SMALL-SIGNAL GAIN DISTRIBUTION ALONG Y DIRECTION, 14: REFERENCE AXIS, 15: POLARIZATION BEAM SPLITTER, 41, 42, 461, 471: POLARIZATION DIRECTION, 46: OUTWARD LASER LIGHT, 47: HOMEWARD LASER LIGHT, 51, 52: DIELECTRIC PLATE, 61, 62: DISCHARGE ELECTRODE, 101: VALLEY LINE, 102: FIRST REFLECTING SURFACE, 103: SECOND REFLECTING SURFACE, 401: INCIDENT LIGHT, 402: OUTGOING LIGHT, 411, 421: S-POLARIZATION COMPONENT, 412, 432: P-POLARIZATION COMPONENT

The invention claimed is:

1. A transverse flow type laser oscillator comprising:
a reciprocating type optical resonator having a reflecting mirror and an output mirror;
a laser medium for amplifying light, provided in the optical resonator; and
a polarization selecting element for controlling the oscillated light to linear polarization, provided in the optical resonator;
wherein the reflecting mirror is an orthogonal mirror having two reflecting surfaces orthogonal to each other, and
the polarization selecting element is arranged such that a polarization direction of the oscillated light is parallel to a reference axis set in a plane perpendicular to an optical axis of the optical resonator,
the orthogonal mirror is arranged such that the polarization direction of the oscillated light is parallel to a valley line of the orthogonal mirror,
a laser gas flow direction is set in a first direction perpendicular to the optical axis of the optical resonator, and a discharge direction is set in a second direction perpendicular to the optical axis and the first direction, and
the reference axis is arranged to intersect with the discharge direction at an angle of 45 degrees.

2. A transverse flow type laser oscillator comprising:
a reciprocating type optical resonator having a reflecting mirror and an output mirror;
a laser medium for amplifying light, provided in the optical resonator; and
a polarization selecting element for controlling the oscillated light to linear polarization, provided in the optical resonator;
wherein the reflecting mirror is an orthogonal mirror having two reflecting surfaces orthogonal to each other, and
the polarization selecting element is arranged such that a polarization direction of the oscillated light is parallel to a reference axis set in a plane perpendicular to an optical axis of the optical resonator,
the orthogonal mirror is arranged such that the polarization direction of the oscillated light is perpendicular to a valley line of the orthogonal mirror,
a laser gas flow direction is set in a first direction perpendicular to the optical axis of the optical resonator, and a discharge direction is set in a second direction perpendicular to the optical axis and the first direction, and
the reference axis is arranged to intersect with the discharge direction at an angle of 45 degrees.

3. A transverse flow type laser oscillator comprising:
a reciprocating type optical resonator having a reflecting mirror and an output mirror;
a laser medium for amplifying light, provided in the optical resonator; and
a polarization selecting element for controlling the oscillated light to linear polarization, provided in the optical resonator;
wherein the reflecting mirror is an orthogonal mirror having two reflecting surfaces orthogonal to each other, and
the polarization selecting element is arranged such that a polarization direction of the oscillated light is parallel to a reference axis set in a plane perpendicular to an optical axis of the optical resonator,
a reflective film for inducing a phase difference corresponding to one-fourth of a wavelength between P-polarization and S-polarization is applied on the respective reflecting surfaces of the orthogonal mirror,
a laser gas flow direction is set in a first direction perpendicular to the optical axis of the optical resonator, and a discharge direction is set in a second direction perpendicular to the optical axis and the first direction, and
the reference axis is arranged to intersect with the discharge direction at an angle of 45 degrees.

4. A transverse flow type laser amplifier comprising:
a bending mirror for reflecting linearly polarized laser light traveling along a predetermined optical axis so as to travel again along the same optical axis; and
a laser medium for amplifying the laser light traveling along the optical axis;
wherein the bending mirror is an orthogonal mirror having two reflecting surfaces orthogonal to each other,
the orthogonal mirror is arranged such that a valley line of the orthogonal mirror is parallel to a reference axis set in a plane perpendicular to the optical axis, and the polarization direction of the laser light is set at an angle of 45 degrees with respect to the valley line of the orthogonal mirror,
a laser gas flow direction is set in a first direction perpendicular to the optical axis of the optical resonator, and a discharge direction is set in a second direction perpendicular to the optical axis and the first direction, and
the reference axis is arranged to intersect with the discharge direction at an angle of 45 degrees.

5. A laser amplifier comprising:
a bending mirror for reflecting linearly polarized laser light traveling along a predetermined optical axis so as to travel again along the same optical axis; and
a laser medium for amplifying the laser light traveling along the optical axis;
wherein the bending mirror is an orthogonal minor having two reflecting surfaces orthogonal to each other, and
the orthogonal minor is arranged such that a valley line of the orthogonal mirror is parallel to a reference axis set in a plane perpendicular to the optical axis, and the polarization direction of the laser light is set at an angle of 45 degrees with respect to the valley line of the orthogonal mirror.

6. The laser amplifier according to claim 5, wherein the laser amplifier is a transverse flow type gas laser amplifier in which a laser gas flow direction is set in a first direction perpendicular to the optical axis of the laser light, and a discharge direction is set in a second direction perpendicular to the optical axis and the first direction, and
the reference axis is arranged to intersect with the discharge direction at an angle of 45 degrees.

* * * * *

UNITED STATES PATENT AND TRADEMARK OFFICE
CERTIFICATE OF CORRECTION

| | | |
|---|---|---|
| PATENT NO. | : 8,958,453 B2 | Page 1 of 1 |
| APPLICATION NO. | : 13/496892 | |
| DATED | : February 17, 2015 | |
| INVENTOR(S) | : Shuichi Fujikawa et al. | |

It is certified that error appears in the above-identified patent and that said Letters Patent is hereby corrected as shown below:

In the Specification

Column 13, lines 25-57, delete entirely.

Column 14, lines 1-56, delete entirely.

Signed and Sealed this
Fourteenth Day of July, 2015

Michelle K. Lee
*Director of the United States Patent and Trademark Office*